United States Patent [19]

Ardon

[11] Patent Number: 4,979,164
[45] Date of Patent: Dec. 18, 1990

[54] SWITCHING SYSTEM RELIABILITY

[75] Inventor: Menachem T. Ardon, Naperville, Ill.

[73] Assignee: AT&T Bell Laboratories, Murray Hill, N.J.

[21] Appl. No.: 356,802

[22] Filed: May 24, 1989

[51] Int. Cl.$^5$ .............................................. H04M 7/14
[52] U.S. Cl. .................................. 370/58.1; 379/269; 379/279; 379/273
[58] Field of Search ............... 379/279, 273, 274, 269, 379/220, 221; 370/58, 58.1

[56] References Cited

U.S. PATENT DOCUMENTS 3,217,109  11/1965  Abert .................................. 379/269
4,583,218  4/1986  Ardon et al. .......................... 370/58

OTHER PUBLICATIONS

G. Zorpette, "Keeping the Phone Lines Open", *IEEE Spectrum*, vol. 26, No. 6, Jun. 1989, pp. 32-36.

Primary Examiner—James L. Dwyer
Attorney, Agent, or Firm—Kenneth H. Samples; R. T. Watland

[57] ABSTRACT

The switch units of a distributed switching system are connected by a central switch for advancing connections between the switch units and also by inter-switch unit trunks. To save switch unit resources, trunk services such as scanning and signaling are not provided to the inter-switch unit trunks while the central switch is available for advancing connections. When the central switch becomes unavailable for advancing connections, as detected by control units in the switch units, the inter-switch unit trunks are connected to the trunk serving circuitry of the switch units and connections are advanced between switch units over the inter-switch unit trunks. Serving the inter-switch units trunks while the central switch is unavailable requires additional switch unit resources but provides for continuity of service which would to otherwise be lost due to the unavailability of the central switch.

18 Claims, 6 Drawing Sheets

16-BIT DATA WORD

SWITCHING SYSTEM RELIABILITY

CROSS-REFERENCE TO RELATED APPLICATIONS

This application is related to the following applications:

M. T. Ardon, application Ser. No. 356,807, filed May 24, 1989, "Improvement in Switching System Reliability", and W. K. Cline et al., application Ser. No. 356,823 filed May 24, 1989, "Improvement in Switching System Reliability".

The related applications are filed concurrently herewith and are assigned to the assignee of the present invention.

TECHNICAL FIELD

This invention relates to a telecommunication switching system and particularly to arrangements for connecting portions of the switching system via normally inactive trunks when the use of a central connection arrangement between them is impossible or undesirable.

BACKGROUND OF THE INVENTION

Local switching systems process originating and terminating calls between customer lines connected to the switching system and trunks to other switching systems. Since most customer lines are connected only to a single local switching system, the availability of telecommunication service to a customer is dependent upon the continued operability of the local switching system.

Such systems are designed and constructed to provide continuing reliable service in the presence of faults. The reliability is sometimes achieved by providing duplicate (redundant) equipment in the more critical parts of the system. When a failing part is detected, the duplicate is placed in service and the failing part is removed. With care, the substitution of duplicate for failing parts can occur without the loss of service to customers.

A distributed switching system is one comprised of a plurality of switch units which interface customer lines and trunks on a peripheral side of the unit and which interface a central switch arrangement on the other side of the unit. Calls between customers and/or trunks connected to different switch units are completed through the central switch. A duplicated distributed switching system comprises a plurality of duplicated switching units which are switchably connected by a duplicated pair of central switches. In the presence of faults, a duplicate switching unit is substituted for a failing one and a duplicate central switch is substituted when a central switch fails. This arrangement provides excellent service for systems which undergo normal failures in only one unit of the duplicated pairs.

A disaster, such as a fire in a switching office, may cause catastrophic failures which are not normal and result in the loss of both units of a duplicated pair. With no duplicate to substitute for a failing unit, the system may not be able to complete calls. For example, the failure of both units of the central switch will isolate the customers connected to one switch unit from the lines and trunks connected to all of the other switch units of the system. Not only is it impossible to reach a large number of the customers on the same switching system, a customer's access to other switching systems normally reached via trunks at other switching units is also lost. Such isolation of customers is a substantial service limitation which is compounded by the fact that damage repair after a disaster may take an extended period of time.

Although the subscriber isolation problem is raised in the context of disaster which destroys the central switch, the substantial isolation of customers can occur in less catastrophic ways. The switch units of a distributed switching system are connected to the central switch by communication links. The complete failure of the communication link between a switch unit and the central switch can isolate the customers of the switching unit served by that link as much as the complete central switch failure.

The co-pending application of Cline et al., case 1-1-1 provides inter-switch unit trunks as an alternative to the central switch communication paths between switching units. Inter-switch unit trunks provide a valuable connection resource when "normal" connections through the central switch are unavailable. However, the inter-switch unit trunks require trunk services such as scanning and signaling which use valuable switch unit controller resources. Also the switch units must provide the capacity to connect inter-switch unit trunks through the switch unit. The controller resources required to serve the inter-switch unit trunks and the connection resources required for connections using the inter-switch unit trunks burden each switch unit and reduce the number of lines and inter-office trunks that a switch unit can serve. Since inter-switch unit trunks are used only when duplicate unit failures occur, the probability of using the inter-switch unit trunks is low and the constant overhead needed to serve the inter-switch unit trunks is not desirable.

Accordingly, a need exists in the art for a telecommunication switching system which can provide continuing switching unit-to-switching unit connections when the central switching arrangement of a distributed switching system cannot be employed to communicate from one switch unit to another and which does not substantially increase the "normal" operation overhead of the switch units.

SUMMARY OF THE INVENTION

This need is met in accordance with the invention in which a pair of switch units is connected (1) by a central switch which cooperates with the switch units to advance connections between them and (2) by an inter-switch unit trunk to which trunk services are provided when the central switch is unavailable. A control arrangement comprising control units of the switch units detects when the central switch is unavailable to interconnect the switch units and a trunk serving means provides trunk services, such as scanning and signaling, to the inter-switch unit trunk when central switch paths are unavailable. The inter-switch unit trunks are then used to complete connections between the switch units. The arrangement provides a switching system which normally completes connections in a straightforward and efficient manner via the central switch without incurring overhead servicing the inter-switch unit trunk. When the central switch becomes unavailable trunk scanning and signaling are provided to the inter-switch unit trunks so that alternative connections are completed via the inter-switch unit trunk.

Advantageously, when the central switch is unavailable a first of the switch units receives call signaling information defining a call destination at a second switch unit and the trunk servicing arrangement responds to that call signaling information by transmitting trunk signaling information defining the call destination to the second switch unit via an inter-switch unit trunk. The second switch unit responds to the unavailability of the central switch by scanning the inter-switch unit trunk to receive the trunk signaling information and advance the connection in response thereto. The resources to signal and scan the inter-switch unit trunk are used only when central switch connections are not available. Also the ability to connect the inter-switch unit trunk to lines of the switch unit is provided only when the inter-switch unit trunks are used for connections. This further reduces the competition for the resources of the switch unit.

The switch units each comprise a control unit which cooperates with a central control associated with the central switch to determine the availability of the central switch for advancing connections. A control unit which fails to receive messages from the central control for a predetermined period of time recognizes central switch unavailability and connects the inter-switch unit trunks to the scanning and signaling apparatus of the switch unit to provide trunk services to the inter-switch unit trunks. Serving the inter-switch unit trunks requires additional switch unit resources but provides for continuity of service which would otherwise be lost.

In accordance with one embodiment of the invention each switch unit has a peripheral side which is connected to a plurality of customer lines and inter-office trunks and an network side connected to the central switch. An inter-switch unit trunk connects the peripheral side of one switch unit to the peripheral side of another switch unit. Trunk services are provided to those inter-office and inter-switch unit trunks connected by a connection arrangement to a trunk servicing arrangement. The inter-office trunks are normally connected by the connection arrangement to the trunk serving unit and in response to the unavailability of the central switch one of the inter-office trunks is disconnected from the trunk server and replaced with an inter-switch unit trunk.

An embodiment of the invention is a time division switching system in which time separated channels are used to convey information to and from lines and trunks. Advantageously, the above-mentioned connection arrangement comprises a multiplexer which connects information from the lines and trunks into the channels of a first time-multiplex line in accordance with information stored in a cyclically accessed control memory. The trunk server reads the information in the channels of the first time-multiplex line to provide trunk scanning. The connection arrangement also comprises a demultiplexer which, under the control of information from the control memory, connects information on the channels of a second time-multiplex line to lines and trunks. Trunk signaling is provided by placing signaling information in the channels of the second time-multiplex line. The connections provided by the connection arrangement are changed by changing the contents of the control memory.

DETAILED DESCRIPTION

Figure 1:
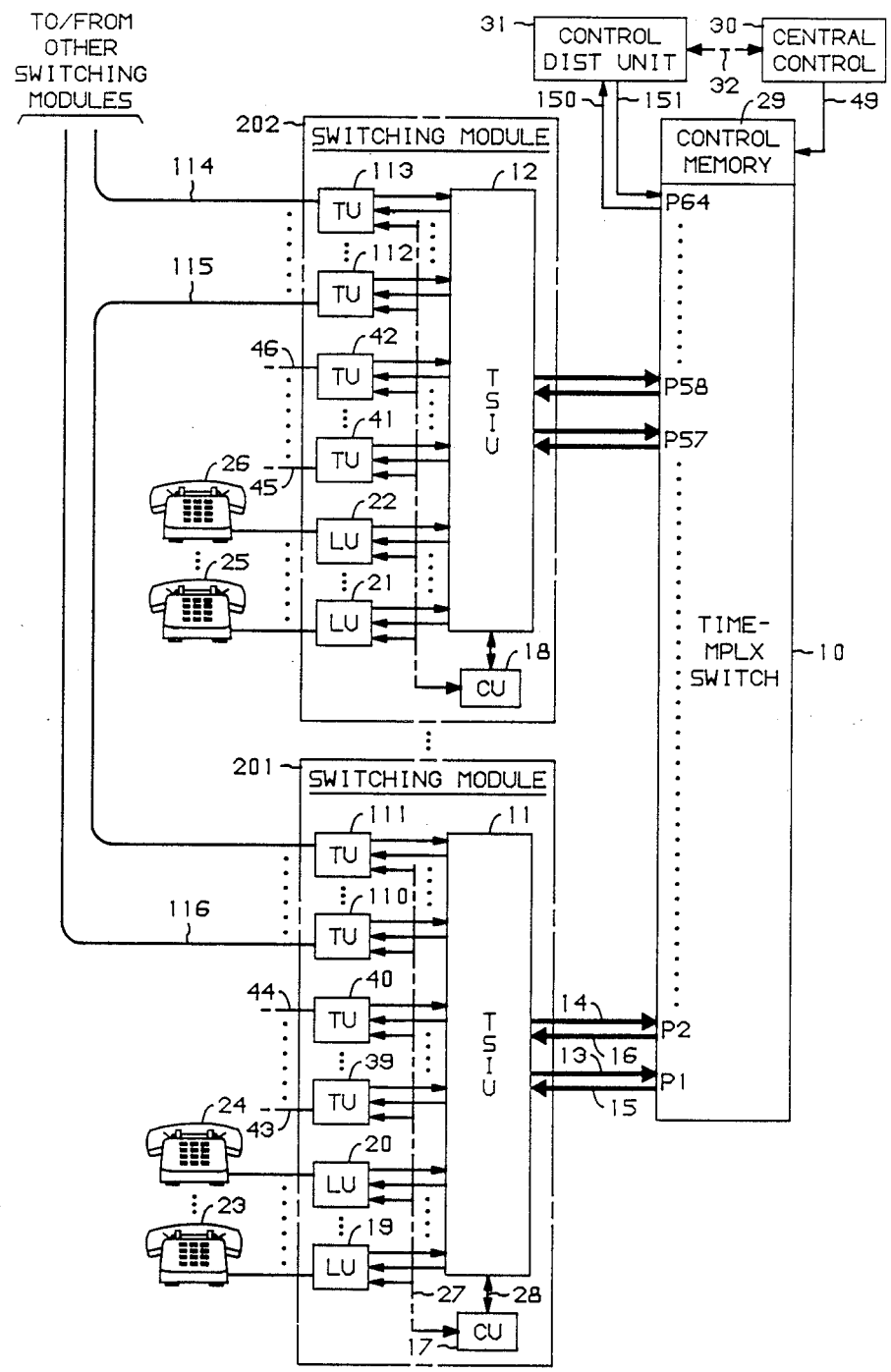
FIG. 1 is a block diagram of a telecommunication switching system embodying the invention.

The time division switching system of FIG. 1 is used to interconnect subscriber sets such as subscriber sets 23 through 26 and trunks such as trunks 43 through 46 and includes a time-multiplexed switch 10 comprising a time-shared space division switch having 64 input terminals and 64 output terminals. Also included is a plurality of time-slot interchange units of which representative time-slot interchange units 11 and 12 are specifically shown. Each time-slot interchange unit 11 and 12 includes a bi-directional time-slot interchanger and is connected to two input terminals and two output terminals of time-multiplexed switch 10. In FIG. 1 time-slot interchange unit 11 is connected to two time-multiplexed switch input terminals via time-multiplexed lines 13 and 14 and to two output terminals, via time-multiplexed lines 15 and 16.

In the description which follows, the input and output terminals of time-multiplexed switch 10 are referred to as input/output terminal pairs. This term is used since the source for data words to an input terminal of a given input/output terminal pair is also the destination for data words from the output terminal of that pair. As shown in FIG. 1, input/output terminal pair P1 is associated with time-multiplexed lines 13 and 15. Each time-multiplexed line 13 through 16 conveys digital information in 125 microsecond frames each comprising 256 time separated channels. Accordingly, each time-slot interchange unit transmits and receives up to 512 channels of digital information during each 125 microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected via individual time-multiplexed lines to a plurality of peripheral units of which line units 19 through 22 and trunk units 39 through 42 and 110 through 113 are shown in FIG. 1. A time-slot interchange unit, its associated control unit and peripheral units are collectively referred to herein as a switching module which is represented in FIG. 1 as switching modules 201 and 202. Switch module 201 comprises line units 19 and 20, trunk units 39 and 40 trunk units 110 and 111 and time-slot interchange unit 11 while switching module 202 comprises line units 21 and 22, trunks units 41 and 42 trunk units 112 and 113 and time-slot interchange unit 12. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The trunk units, e.g. 39 and 40, perform analogous functions for trunks such as detecting trunk seizures and sending and receiving trunk signaling to and from other systems. The trunks can be either of the analog or digital type. One example of a digital trunk is the T1 carrier system disclosed in the J. H. Green et. al., U.S. Pat. No. 4,059,731, on which 24 separate communication channels are multiplexed.

Figure 3:
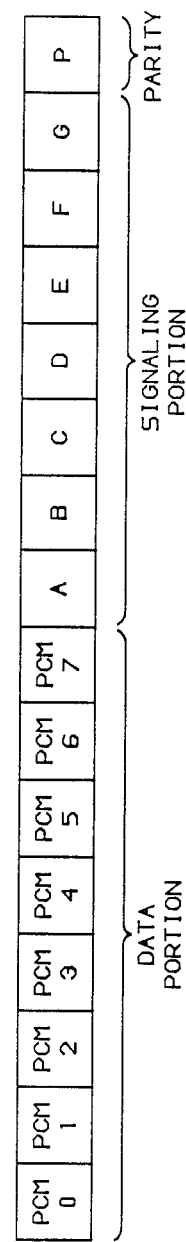
FIG. 3 represents a digital data word conveyed in the embodiment.

The relationship of subscriber sets, line/trunk units and time-slot interchange units is substantially the same for each of such groups of interconnected inputs. Accordingly, while the description which follows relates directly to subscriber set 23, line unit 19 and time-slot interchange unit 11 (switching module 201), it shows the relationships for all other groups of such units. Furthermore, an analogous relationship exits between trunks, trunk units and time-slot interchange units. Line unit 19 scans the lines connected to each subscriber set to detect requests for service. When such a request is detected, line unit 19 transmits to control unit 17, a message indicating the request and the identity of the requesting subscriber set. This message is tranmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. FIG. 3 represents the digital data word format used in the present system which format includes an 8-bit data portion and a 7-bit signaling portion. Line unit 19 also transmits in the signaling bit position labeled A (the A-bit) of the assigned channel an indication of the DC state, i.e., open circuit/closed circuit of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11.

Two types of trunks are provided in the present system. The first type consists of inter-office trunks represented by trunks 43 through 46 which are connect to other switching systems. The second type is comprised of trunks 114 through 116 to other switching modules of the switching system. Trunks, e.g., 115 to other switching modules of the same switching system are referred to herein as inter-switch module trunks. The inter-switch module trunks are used to advance connections between switch modules when paths through the time-multiplex 10 are not available. In normal operation, when communication paths though the time-multiplex switch 10 are available, the inter-switch module trunks are inactive and trunk services, such as scanning and signaling, are not provided to them. Trunk services are provided to the inter-office trunks, however, so that connections to other switching offices can be completed. In the following description, trunks receiving trunk services are referred to as active trunks and trunks which do not receive trunks services are referred to as inactive trunks. The use of inter-switch module trunks is discussed later herein.

The inter-office trunks, e.g., 43 and 44 are assigned a time-separated channel into the time-slot interchange unit at system initialization and do not require the assignment of a channel when trunk activity begins (origination). The trunk units, e.g., 39 and 40 of the embodiment detect trunk signaling such as trunk seizure and reflect this signaling in the A-bit of the pre-assigned channel. Inband signaling, such as MF tones, is conveyed to the time-slot interchange unit via the PCM data portion of the assigned channel. Control unit 17 detects trunk signaling via the communication path 28 in the same manner that subscriber signaling is detected.

As previously stated, each time-multiplexed line between a time-slot interchange unit and the time-multiplexed switch 10 has 256 channels each 125 microsecond frame. These channels are assigned numerical designations from 1 to 256 in sequence as they occur. This sequence of channels recurs so that a given channel will be available every 125 microseconds. The time-slot interchange function takes the data words received from the line and trunk units and places them in channels on the time-multiplexed line between the time-slot interchange units and the time-multiplexed switch 10 under the control of control units 17 and 18.

Time-multiplexed switch 10 operates in recurring frames of time-slots where each 125 microsecond frame comprises 256 time-slots. During each time-slot, time-multiplexed switch 10 is capable of connecting data words received at any of its 64 input terminals to any of its 64 output terminals in accordance with time-slot control information stored in a control memory 29. The configuration pattern of connections through time-multiplexed switch 10 repeats itself every 256 time-slots and each time-slot is assigned a numerical designation in sequence from 1 to 256. Accordingly, during a first time-slot TS 1 the information in a channel (1) on time-multiplexed line 13 may be switched by time-multiplexed switch 10 to an output terminal P64 while during the next time-slot TS 2 the next channel (2) on time-multiplexed line 13 may be switched to an output terminal P57. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output terminal pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time-slot having the same numerical designation as a control channel, time-multiplexed switch 10 connects the data word occupying that control channel to output terminal P64 and connects input terminal P64 to the output terminal associated with the above-mentioned control channel.

The following is an example of the embodiment when channel 1 is the control channel for time-multiplexed lines 13 and 15, and channel 2 is the control channel for time-multiplexed lines 14 and 16. During time-slot TS 1 information from control memory 29 defines, among other connections, that the control word in channel 1 of time-multiplexed line 13 is connected to output terminal P64 and that the control word in channel 1 at input terminal P64 is connected to time-multiplexed line 15. Similarly, during time-slot TS 2, information from control memory 29 defines that the control word in channel 2 of time-multiplexed line 14 is connected to output terminal P64 and that the control word in channel 2 at input terminal P64 is connected to time-multiplexed line 16. When operating in this manner, output terminal P64 receives from time-multiplexed switch 10 all control words in a channel having the same numerical designation in which they were transmitted to the time-multiplexed switch. Further, each control channel is connected to receive control words from input terminal P64 during the time-slot having the same numerical designation as their associated control channel. Control words switched to output terminal P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a destination portion and a signaling information portion. The destination portion uniquely defines the expected destination of the signaling portion of the control message. Control distribution unit 31 interprets the destination portion of each control message to determine the proper destination for the control message and retransmits the message to input terminal P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input terminal P64 during the channel having the same numerical designation as the control channel associated with time-slot interchange unit 12.

A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of the system shown in FIG. 1 is described in detail in the above-cited Beuscher et. al. U.S. Pat. No. 4,322,843.

The control messages exchanged among units, e.g., 17 and 18 and the central control 30 are used to advance call completion and to determine the status of the switching system and its parts. Normal call processing involves the receipt of call signaling information from a line or trunk unit at one switch module, the transmission of a control message from the receiving switch module to central control 30 defining the incoming call and the transmission of control messages to the receiving and call destination switch modules defining the path through the time-multiplex switch 10 to be used for call completion. The involved switching modules then connect the appropriate lines or trunks to the defined time-multiplex switch 10 path. The exchange of call completion control messages coordinates the operation the involved switching modules and the central control 30 and relies on a decision by the central control for the time-multiplex switch 10 path to be used.

Due to the interactive nature of normal call completion, knowledge of the status of the control units and the central control 30 is important to each control unit. Each control unit, e.g., 17 and 18 periodically transmits a communication check control message to the central control 30 which replies with a predictable response message to the source control unit. A control unit, e.g., 17 which does not receive appropriate response messages from central control 30, assumes a failure of the central control or the time-multiplex switch communication link thereto and changes its status to the stand alone mode. In the stand alone mode a control unit is responsible for reacting to input stimuli without assistance from the central control and without paths though the time-multiplex switch 10. Each control unit includes a location in its memory 57 which is marked to indicate stand alone status of that control unit.

Figure 2:
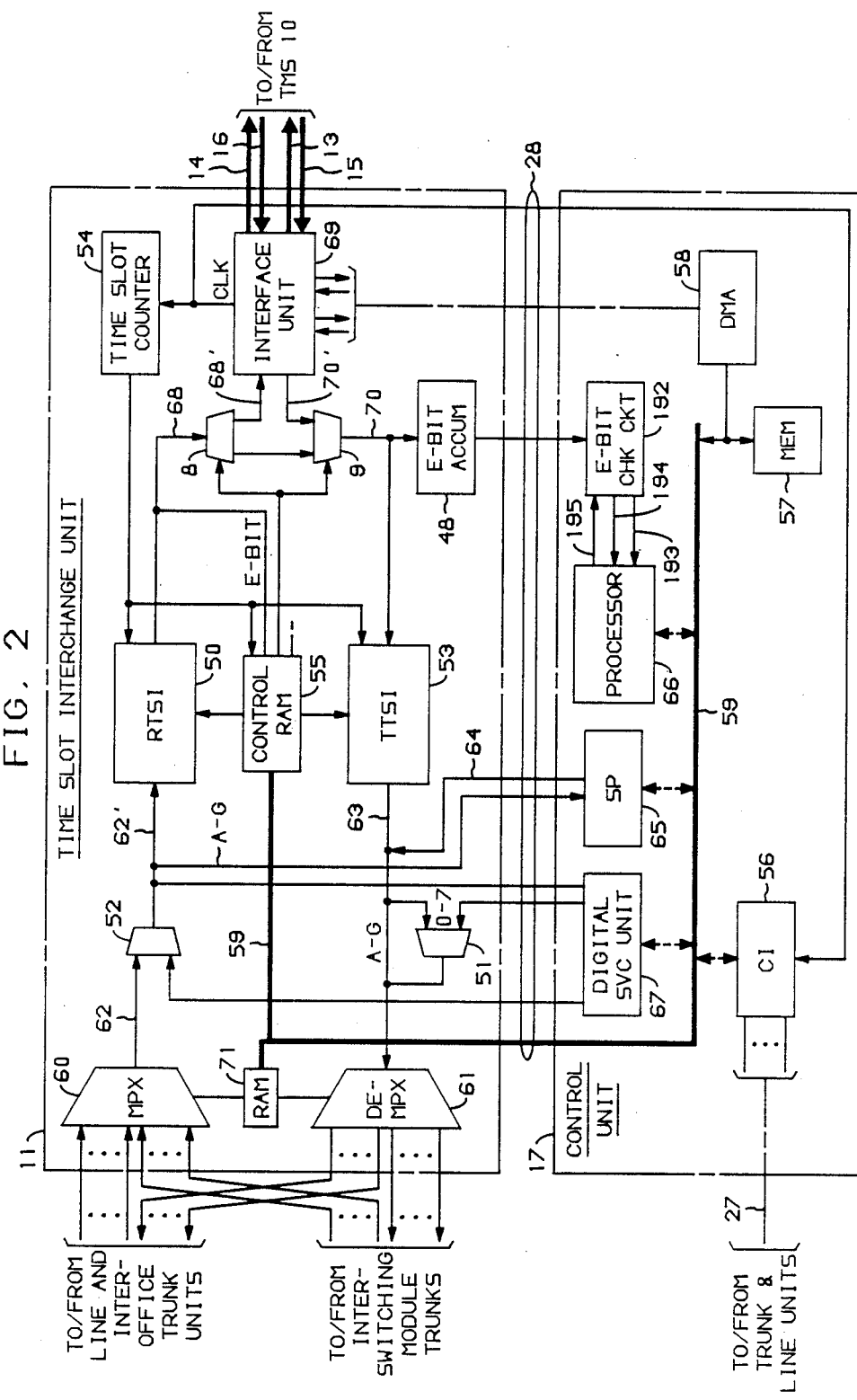
FIG. 2 in a block diagram of a time-slot interchange unit employed in FIG. 1.

Central control 30 expects communication check messages from each control unit, e.g., 17 at a predetermined periodic rate. Central control 30 detects when such such messages are not properly received, marks the delinquent control unit as unavailable in the central control memory and transmits unavailability control messages to the other control units. The control units respond to the unavailability message from central control 30 by marking the unavailable control unit as being in the stand alone mode in their individual control unit memory 57 (FIG. 2).

Memory 57 (FIG. 2) of each control unit, e.g., 17 stores the program for the control of its associated control unit and data regarding the function of the control unit, its associated time-slot interchange unit and its associated subscribers and trunks. The data stored in memory 57 includes translation tables for translating calling information into information identifying the routing for a call and information defining the status, e.g., stand alone of all switching modules, e.g., 201 and 202. The main processing entity of control unit 17 is a processor 66 which operates in response to instructions and data stored in memory 57. Control unit 17 includes a control interface circuit 56 which receives instructions from processor 66 via a bus 59 and in response thereto, communicates with the peripheral units, e.g., line units 19 and 20, via communication path 27. A DMA unit 58 is also included in control unit 17 and is used in conjunction with an interface unit 69 to transmit and receive the control messages on time-multiplexed lines 13 through 16 to and from the time-multiplex switch 10.

Each of the line and trunk units transmits recurring frames of information each comprising 32 channels of 16 bits each. This information is transmitted to a multiplex unit 60 (FIG. 2) within time-slot interchange unit 11. Multiplex unit 60 receives the output signals from the peripheral units which signals are selectively transmitted on an output time-multiplexed line 62 having 512 channels for each 125 microsecond frame. The connection of peripheral unit channels to the channels of time-multiplex line 62 by multiplex unit 60 is controlled by information stored in a control RAM 71 which is cyclically accessed at the time-multiplexed line 62 rate. Control information is written into control RAM 71 by processor 66 at the time of system initialization to connect a predetermined number of subscriber line channels and to connect the channels from inter-office trunks to the channels on line 62. No channel from an inter-switching module trunk is connected through multiplex unit 60 at initialization. Similarly, a demultiplex circuit 61 receives 512 channels of 16 bits each on a time-multiplexed line 63 which channels are distributed, in a manner determined by the information stored in control RAM 71, to the peripheral unit channels connected to the line and trunk units, e.g., 19 and 40. The operation of demultiplexer unit 61 complements the operation of multiplex unit 60 so that bi-directional communication with peripheral units is achieved.

The information in a given channel on time-multiplex line 62 is transmitted via a gate 52 and a path 62' to a receive time-slot interchanger 50 where it is stored in a memory location uniquely associated with that channel. The particular memory location of receive time-slot interchange 50 into which a given data word is stored is defined by time-slot designation signals generated by time-slot counter 54. Time-slot counter 54 generates a recurring sequence of 512 time-slot designations at the rate of one time-slot designation per time-slot. The particular time-slot designation generated during the time-slot in which a given data word is received defines the memory location within receive time-slot interchanger 50 which is to store that data word. Data words are also read from receive time-slot interchanger 50 at the rate of one data word per time-slot. The memory address of the data word to be read from receive time-slot interchanger 50 during a given time-slot is obtained by reading control RAM 55. Control RAM 55 is read once per time-slot at an address defined by the time-slot designation from time-slot counter 54 and the quantity so read is transmitted to receive time-slot interchanger 50 as the read address for that time-slot.

Data words read from receive time-slot interchanger 50 are transmitted to time-multiplexed switch 10 via a time-multiplexed line 68, a gate 8, a time-multiplexed line 68' and an interface unit 69. Data words from time-multiplexed switch 10 are received by time-slot interchange unit 11 by interface unit 69, and are conveyed via a time-multiplexed line 70', a gate 9 and a time-multiplexed line 70 to transmit time-slot interchanger 53. For calls among the line and trunk units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53.

Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to the peripheral units, e.g., line unit 19. It should be noted that control RAM 55 may be implemented as a number of control memories, each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and not described in greater detail herein. One arrangement for reading and writing data words in time-slot memories is described in detail in U.S. Pat. No. 4,035,584, J. W. Lurtz.

Trunk services such as scanning and signaling are provided by the control unit 17 which includes a signal processor 65 and a digital service unit 67. Signal processor 65 reduces the real time load requirement of processor 66 by receiving and analyzing the signaling portion (bits A through G, FIG. 3) of each data word received on line 62 from line and trunk units and by transmitting signaling bits to the line and trunk units. Processor 66 reads the signaling information of each incoming channel on time-multiplex line 62' from signal processor 65. This information, as attributed by processor 66 to the line or trunk connected to a channel, shows line or trunk status for call processing purposes. Signal processor 65 also transmits signaling information. Signaling bits are passed from the processor 66 to signal processor 65 along with indications of their destination channel on outgoing time-multiplex line 63. Signal processor 65 then controls the signaling bits A through G of the outgoing channels via the path 64 to transmit signaling information to the line and trunk units.

Digital service unit 67 receives the PCM data portion of each data word received by line 62' from the line and trunk units to detect PCM tone signals from subscribers and trunks. The processor 66 periodically reads the received signaling information from the digital services unit 67 to detect line and trunk signaling. Digital service unit 67 is also used to transmit tones and signals in PCM format via a gate 51 to subscribers and trunks and via a gate 52 to time-multiplex switch 10. Definitions of the tones and signals are sent from processor 66 to digital service unit 67 which places signals in appropriate channels.

The primary mode of control information exchange comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchanger unit via time-multiplexed switch 10 utilizing the time-slot assigned for that call. The E-bit position of the data word in an active call time-slot is used for the secondary mode communication. However, it can be seen that any or all of the signaling bits could be used in this secondary communication mode. The E-bit serves the dual purpose of signal acknowledgement during the establishment of a path through the time-multiplexed switch 10 and continuing path continuity check during the connection. The operation of E-bit accumulator 48 and E-bit check circuit 192, which communicates with processor 66 via conductors 193, 194, and 195 in performing these dual purposes is described in detail in the above-cited Beuscher, et. al., U.S. Pat. No. 4,322,843.

During normal operation, when connection paths are available through the time-multiplex switch 10, only subscriber lines and trunks to other switching systems are connected by multiplex unit 60 to channels in the time-slot interchange unit, e.g., 11. This allows trunk services, such as scanning and signaling, to be provided by control unit 17 to the inter-office trunks which are expected to be used, without expending control unit resources on trunks, such as inter-switch module trunks, which are not expected to be used. When events such as a time-multiplex switch 10 failure make the use of inter-switch module trunks desirable for connections the system reconfigures the connection patterns of multiplex unit 60 and demultiplex unit 61 to provide trunk services to inter-switch module trunks. The inter-switch module trunks are then used for alternative connections.

Figure 5:
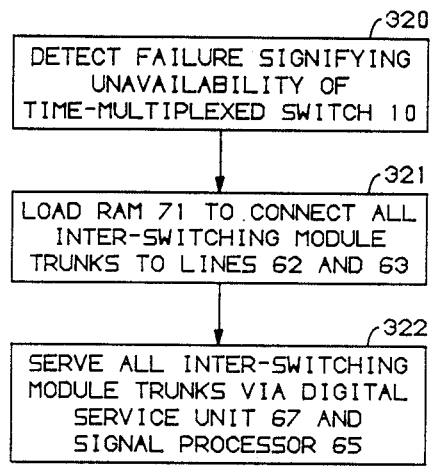
FIGS. 5 and 6 are flow diagrams of processes for connecting inter-switch unit trunks to a trunk serving arrangement.

As discussed above, control messages between control units, e.g., 17 and 18 and the central control 30 are used to detect the unavailability of time-multiplex switch 10 for connections between switching modules. When unavailability is detected by a switching module, that switching module reconfigures itself to provide trunk services to the attached inter-switch module trunks. FIG. 5 is a flow diagram of the reconfiguration method used by a switching module which detects that it cannot use the time-multiplex switch 10 to advance connections. First the unavailability of the time-multiplex 10 is detected in block 320 by the failure to receive control messages from the central control 30 as above discussed. This results in the stand alone mode by the detecting switching module where trunk services are provided to all of the inter-switch module trunks, e.g., 115. After the performance of block 320 a switching module proceeds to block 321 where information identifying the available inter-switch module trunks is read from memory 57 and written into RAM 71 to define the connections of inter-switching module trunks to channels on time-multiplex lines 62 and 63. The digital services unit 67 and the signal processor 65 are then used by processor 66 to provide trunk services to the inter-switch module trunks in block 322.

Figure 6:
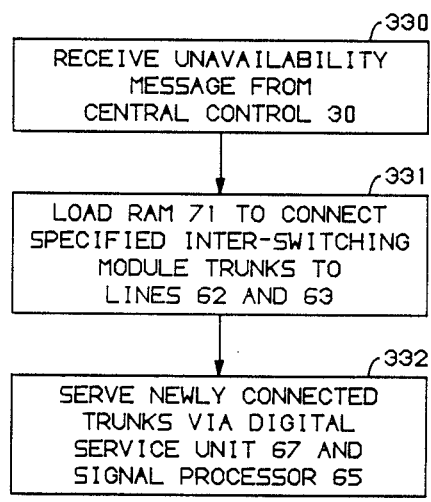

As previously discussed when central control 30 detects that a switching module cannot be accessed via the time-multiplex switch 10 control messages are sent to the other switching modules notifying them of the unavailability of the time-multiplex 10 for connection to the inaccessible switching module. The central control 30 includes in its data base information identifying the inter-switching module trunks between all switching modules. When the central control 30 detects an inaccessible switching module it transmits a message to each other switching module indicating the unavailability and identifying inter-switch module trunks between the inaccessible switching module and the switching module receiving the message. This message is received by a switching module in block 330 (FIG. 6). The receiving switching module responds to the unavailability message by loading RAM 71 with information to connect (block 331) each inter-switch module trunk identified by the message from central control 30 to the time-multiplex lines 62 and 63. The newly connected trunks are then served (block 332) as discussed above. In the present embodiment trunk services are provided to any trunk (either inter-switch module or inter-office) connected to a channel on time-multiplex lines 62 and 63. Connection of a trunk to channels on time-multiplex lines 62 and 63 also enables the switching of information to and from that trunk by the time-slot interchange unit, e.g., 11.

Figure 4:
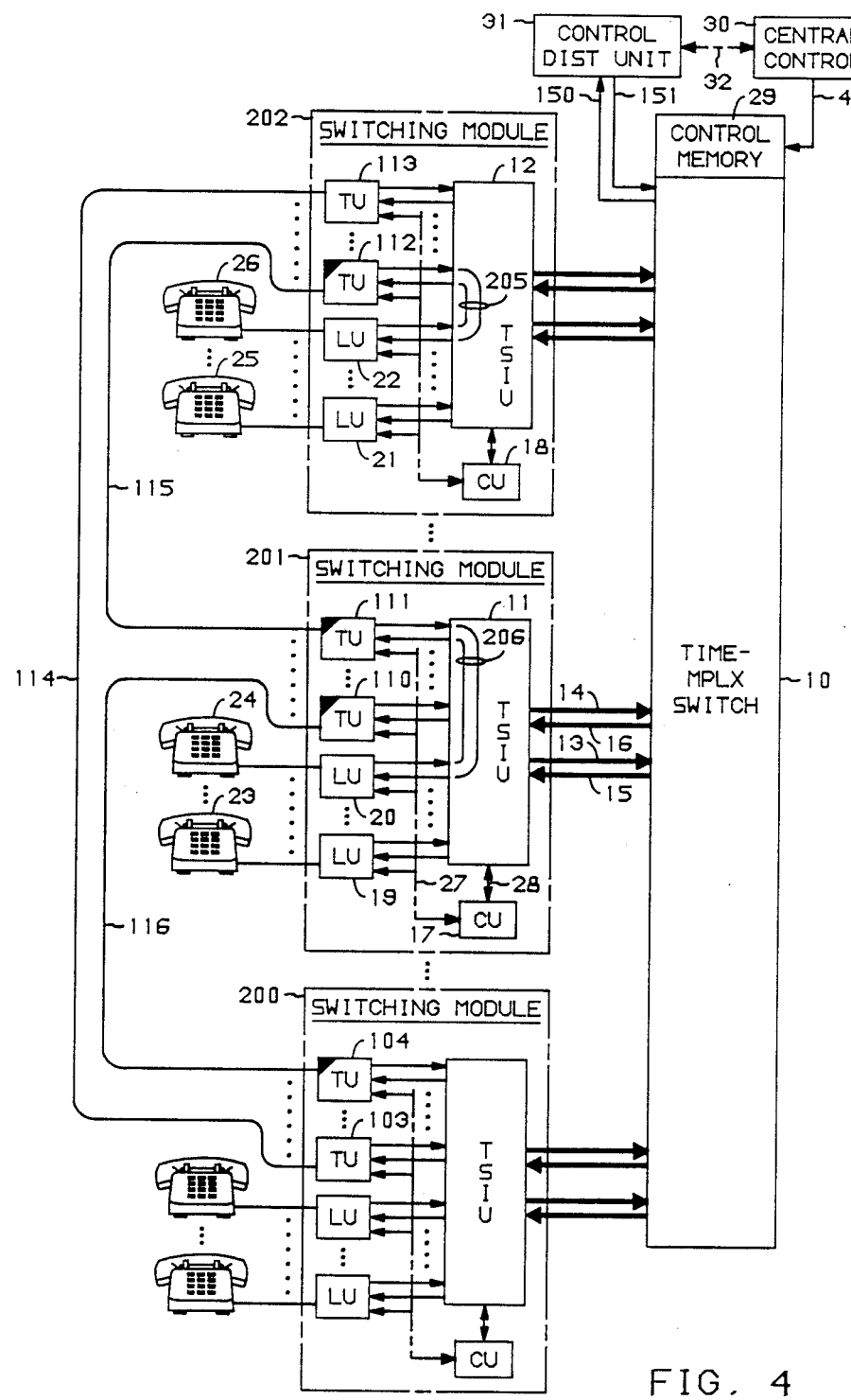
FIG. 4 represents an arrangement for interconnecting switch units with inter-switch unit trunks.

FIG. 4 represents a time division switching system of the type disclosed in FIG. 1 and components having the same reference numeral as like components in FIG. 1 are the same. The system shown in FIG. 4 comprises three representative switch modules 200 through 202. These switch modules are interconnected by bi-directional inter-switch module trunks 114, 115 and 116. Trunk 114 connects trunk unit 113 of switch module 202 to trunk unit 103 of switch module 200, trunk 115 connects trunk unit 112 of switch module 202 to trunk unit 111 of switch module 201 and trunk 116 connects trunk unit 110 of switch module 201 to trunk unit 104 of switch module 200.

In FIG. 4 only the inter-switching module trunks 114 through 116 and their associated trunk units are shown. Initially, time-multiplex switch 10 is available for connections between all switching modules and all the trunks 114 through 116 are inactive. That is, they are not connected to time-multiplex lines 62 and 63 (FIG. 2) of any time-slot interchange unit 11 and accordingly they receive no trunk services. The control unit of each switching module 200 through 202 periodically transmits messages to central control 30 in order to determine continuing time-multiplex switch 10 of availability. The central control 30 responds to each received message so that the switching modules know of the continued availability.

Assume that a complete failure of time-multiplex lines 13 through 16 connecting switching modules 201 to time-multiplex switch 10 occurs. In this event, central control 30 no longer receives messages from switching module 201 and switching module 201 no longer receives response messages from central control 30. Control unit 17 of switching module 201 detects the absence of messages from central control 30 and performs the previously described sequence of FIG. 5 to make all of the its inter-switching module trunks active by connecting them to time-multiplex lines 62 and 63 of time-slot interchange unit 11. Thus, trunk services are provided to trunks 115 and 116 at switching module 201.

Central control 30 detects the absence of messages from switching module 201 and determines that switching module 201 cannot communicate through the time-multiplex switch 10, that is, it is in the the stand alone mode. Central control 30 then searches its memory to determine which inter-switch module trunks, e.g., 114 through 116 can be used to communicate between switching module 201 and the other switching modules 200 and 202 of the system. Trunk 115 to switching module 202 and trunk 116 to switching module 200 are found in this search. Unavailability messages are then transmitted by central control 30 to switching module 202 identifying trunk 115 and to switching module 200 identifying trunk 116. In response switching modules 200 and 202 follow the procedures described with regard FIG. 6 to provide trunk services to trunk 116 and 115, respectively. In FIG. 4 the trunk units 104, 110, 111, and 112 which are connected to newly activated trunks 115 and 116 include a darkened triangle in the upper left corner to represent that they are receiving trunk service.

Figure 7:
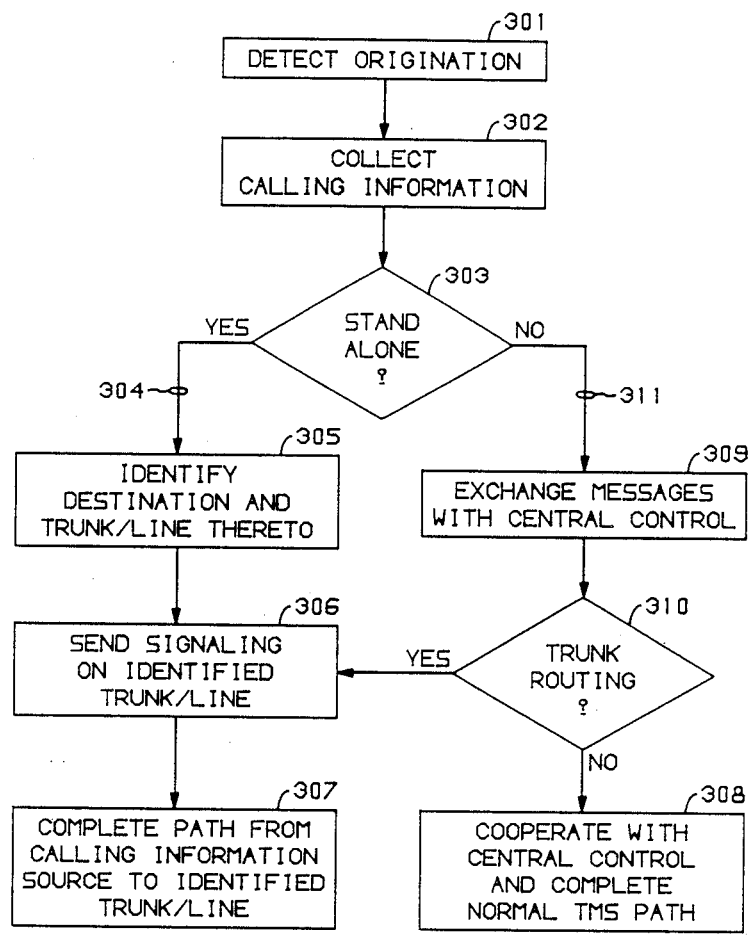
FIG. 7 is a flow diagram of a call completion process.

FIG. 7 is a flow diagram of the procedures performed by all switching modules, e.g., 202 in the completion of connections. The switching system of FIG. 4 operates in accordance with the call processing routine of FIG. 7 which is described in terms of exemplary call from subscriber set 26 of switching module 202 to subscriber set 24 of switching module 201.

Control unit 18 (block 301, FIG. 7), by means described with regard to FIGS. 1 through 3, detects when subscriber set 26 goes off-hook and begins to collect the dialed digits. In accordance with the present example, the dialed digits define subscriber set 24 of switch module 201. When all digits are collected (block 302) the call processing routine proceeds to block 303 where the switching module status is checked and a decision is made to use normal time-multiplex switch routing or the alternative inter-switch module trunk routing. The status information stored in memory 57 (FIG. 2) is read to make this decision. When, as in the present example, a switching module, e.g., 202 is not in the stand alone mode the routing process continues from block 303 via path 311 to block 309. In block 309 control unit 18 transmits a control message identifying the called number at switching module 201 to central control 30. Since, in the present example, switching module 201 is unavailable via the time-multiplex switch 10 central control 30 returns a message to control unit 18 identifying that newly activated inter-switch module trunk 115 is to be used to complete the call. In response to the message from central control 30 control unit 18 recognizes in block 310 that inter-switch module trunk 115 is to be used to complete the call and proceeds to block 306 (had a time-multiplex switch 10 connection been available, the switching module 202 would have proceeded to block 308 where a specified time-multiplex switch 10 path would have been used). In block 306 control unit 18 seizes trunk 115 which is presently receiving scanning and signaling trunk services from switch module 202 and proceeds to send representations of the dialed digits on trunk 115 in response to the appropriate acknowledgement signals from switching module 201. Switching module 202 finally completes path 205 between subscriber set 26 and trunk 115 (block 307). The completed path consists of receive time-slot interchange 50, gates 8 and 9 and transmit time-slot interchange 53 as previously discussed.

With some overlap of operation with switch module 202, switch module 201 starts a call processing program as shown in FIG. 7 in response to the seizure of trunk 115 by switching module 202. Switching module 201 completes the origination with acknowledgement signals (block 301) and collects the digits from trunk 115 in block 302. The call processing routine in switching module 201 determines from the status information in its memory 57 (FIG. 2) that it is in the stand alone mode (block 303) and proceeds via path 304 to block 305. Control unit 17 consults its translation table (block 305) using the digits received from trunk 115 and determines that they represent subscriber set 24. Switching module 201 then signals subscriber set 24 (block 306) and completes the path 206 between line unit 20 and trunk 115 (block 307) upon answer at subscriber set 24. Subscriber set 24 is then connected to subscriber set 26 via the path provided by path 205 through time slot interchange unit 12, the trunk 115 and the path 206 through time-slot interchange unit 11. This path is an alternative to the unavailable (in the present example) path through time-multiplex switch 10.

What is claimed is:

1. A telecommunication switching system comprising:
   a first and second switch unit,
   a central connection means connected to said first and said second switch units and cooperative therewith for selectively advancing connections there between;
   a trunk connecting said first and said second switch units;
   means for detecting the unavailability of said central connection means for advancing connections between said first and second switch units; and
   means responsive to said detecting means for providing trunk services to said trunk following detection of said central connection means being unavailable to connect said first and second switch units.

2. The system of claim 1 comprising means for advancing a connection between said first and second switch units over said trunk.

3. The system of claim 1 wherein said trunk serving means comprises, means in said first switch unit for transmitting trunk signaling information on said trunk; and
   means in said second switch unit for receiving said trunk signaling information from said trunk.

4. A telecommunication switching system comprising;
   a first and a second switch unit each comprising a plurality of subscriber lines, a first plurality of trunks connected to other switching systems and a second trunk connecting said first and second switching units;
   means for providing trunk services to said first plurality of trunks;
   central connection means connected to said switch units and cooperative with said switch units for selectively interconnecting said switch units to advance connections between ones of said lines and said first plurality of trunks on different ones of said switch units;
   means for detecting the unavailability of said central connection means for advancing a connection; and
   means responsive to said detecting means for providing trunk services to said second trunk following the detection of the unavailability of said central connection means to connect said first and said second switch units.

5. The system of claim 4 further comprising;
   means for advancing a connection between lines and trunks on different ones of said switch units over said second trunk.

6. The system of claim 4 comprising:
   means in said first switch unit for receiving on a first subscriber line, call signaling information defining a call destination on said second switch unit; and
   said trunk serving means comprises first serving means at said first switch unit responsive to said call signaling information and said detecting means for transmitting trunk signaling information on said second trunk and second serving means at said second switch control unit responsive to said detecting means for receiving said trunk signaling information.

7. The system of claim 6 comprising:
means at said second switch unit for connecting said second trunk to said call destination responsive to said trunk signaling information; and
means at said first switch unit for connecting said first subscriber line to said second trunk.

8. A telecommunication switching system comprising:
a first and a second switch unit each comprising a peripheral side connected to a plurality of lines and first trunks and a network side connected to a central connection means for selectively connecting said lines and first trunks to said central connection means;
said central connection means comprises means cooperative with said switch units for selectively interconnecting said switch units to advance connections between said lines and said first trunks on different ones of said switch units;
a second trunk connecting the peripheral side of said first switch unit to the peripheral side of said second switch unit;
means for detecting the unavailability of said central connection means for advancing a connection between said first and said second switch units; and
trunk serving means, responsive to said determining means for providing trunk services to said second trunk.

9. The system of claim 8 comprising:
means for advancing a connection between said first and said second switch units over said second trunk.

10. The system of claim 8 comprising means at said first switch unit for receiving call signaling information defining a call destination on said second switch unit; and
said trunk serving means comprises means responsive to said call signaling information and said detecting means for transmitting trunk signaling information, defining said call destination, on said second trunk.

11. The system of claim 10 wherein said trunk serving means comprises means responsive to said detecting means for receiving said trunk signaling information; and
said second switch unit comprises means responsive to said received trunk signaling information for connecting said second trunk to said call destination.

12. A telecommunication switching system comprising:
a first and a second switch unit each comprising a peripheral side connected to a plurality of lines and first trunks connected to other switching systems and a network side connected to a central connection means for selectively connecting said lines and first trunks to said central connection means;
said central connection means comprising means cooperative with said switch units for selectively interconnecting said switch units to advance connections between said lines and said first trunks on different ones of said switch units;
a second trunk connecting the peripheral side of said first switch unit to the peripheral side of said second switch unit;

trunk serving means for providing trunk services to ones of said first and second trunks connected thereto;
connecting means for connecting said first trunks to said trunk serving means;
means for detecting the unavailability of said central connection means for advancing connections between said first and second switch units; and
control means responsive to said detecting means for controlling said connection means to connect said second trunk to said trunk serving means following the detection of the unavailability of said central connection means to interconnect said switch units.

13. The system of claim 12 wherein said control means comprises storage means for storing information to control the ones of said first and said second trunks connected by said connecting means to said trunk serving means.

14. The system of claim 13 wherein said connecting means comprises multiplex means for selectively connecting said first and second trunks to the channels of a first time multiplexed line and said control means comprises means for periodically reading said storage means to define the ones of said first and second trunks to be connected to a channel of said first time multiplexed line.

15. The system of claim 14 wherein said trunk serving means comprises means for reading the channels of said first time multiplex line.

16. The system of claim 14 wherein said connection means comprises demultiplex means for selectively connecting the channels on a second time multiplex line to said first and second trunks and said control means comprises means for periodically reading said storage means to define the one of said first and second trunks to be connected to a channel of said second time multiplex line.

17. The system of claim 16 wherein said trunk serving means comprises means for writing information into the channels of said second time multiplex line.

18. A telecommunications switching system comprising:
a plurality of switch units, each comprising a plurality of line appearances and a plurality of trunk appearances, for selectively connecting said appearances to a central connection means;
said central connection means connected to said plurality of switch units and cooperative with said switch units for selectively interconnecting said switch units to advance connections between ones of said appearances on different ones of said switch units; and
an alternative arrangement for connecting a first one of said appearances on a first one of said switch units to a second one of said appearances on a second one of said switch units comprising:
means for connecting a predetermined one of said trunk appearances on said first switch unit to a predetermined one of said trunk appearances on said second switch unit; and
control means for providing trunk services to said connecting means and for advancing a connection between said first and second appearances via said connecting means when central connection means is unavailable to interconnect said first and second switch units.

* * * * *